(12) United States Patent
Nakabe et al.

(10) Patent No.: US 7,724,297 B2
(45) Date of Patent: May 25, 2010

(54) IMAGING DEVICE HAVING A DISPLAY TO DISPLAY IMAGES CAPTURED BY A PLURALITY OF IMAGE SENSORS WITH DIFFERENT DISPLAY REGIONS

(75) Inventors: Kauzuya Nakabe, Hachioji (JP); Yoshio Fukuda, Hachioji (JP); Hitoshi Komine, Hachioji (JP); Toshimasa Miura, Yokohama (JP); Makoto Ikeda, Kunitachi (JP)

(73) Assignee: Olympus Imaging Corp., Tokyo (JP)

( * ) Notice: Subject to any disclaimer, the term of this patent is extended or adjusted under 35 U.S.C. 154(b) by 510 days.

(21) Appl. No.: 11/656,747

(22) Filed: Jan. 22, 2007

(65) Prior Publication Data

US 2007/0188629 A1   Aug. 16, 2007

(30) Foreign Application Priority Data

Feb. 14, 2006   (JP)   .............................. 2006-037234

(51) Int. Cl.
*G02B 13/16* (2006.01)
*H04N 5/225* (2006.01)
*H04N 5/232* (2006.01)
*G03B 13/00* (2006.01)

(52) U.S. Cl. ........................ 348/335; 348/344; 348/345

(58) Field of Classification Search .......... 348/335–345
See application file for complete search history.

(56) References Cited

U.S. PATENT DOCUMENTS

| 5,646,679 | A | * | 7/1997 | Yano et al. | .................... | 348/47 |
| 7,057,647 | B1 | * | 6/2006 | Monroe | ................... | 348/217.1 |
| 2004/0130649 | A1 | * | 7/2004 | Lee | ............................ | 348/345 |
| 2005/0179807 | A1 | * | 8/2005 | Lin | ............................ | 348/344 |
| 2007/0024737 | A1 | * | 2/2007 | Nakamura et al. | .......... | 348/335 |

FOREIGN PATENT DOCUMENTS

JP   2000-175100   6/2000

* cited by examiner

*Primary Examiner*—Jason Chan
*Assistant Examiner*—Pritham Prabhakher
(74) *Attorney, Agent, or Firm*—Straub & Pokotylo; John C. Pokotylo (57) ABSTRACT

An imaging device comprises a photographing lens, a first imaging sensor for taking a subject image formed by the photographing lens, a second image sensor for taking a subject image formed by the photographing lens, an optical path switching section for selectively switching subject light that has passed through the photographing lens to either one of the first image sensor or the second image sensor, a display section for displaying an image taken by the second image sensor, and a display region storage section for storing information representing a region for display on the display section from a region where imaging by the second image sensor is possible. The display section controls the display region based on the information stored in the display region storage section.

4 Claims, 6 Drawing Sheets

IMAGING DEVICE HAVING A DISPLAY TO DISPLAY IMAGES CAPTURED BY A PLURALITY OF IMAGE SENSORS WITH DIFFERENT DISPLAY REGIONS

Benefit is claimed, under 35 U.S.C. §119, to the filing date of prior Japanese Patent Application No. 2006-37234, filed on Feb. 14, 2006. This applications is expressly incorporated herein by reference. The scope of the present invention is not limited to any requirements of the specific embodiments described in the application.

BACKGROUND OF THE INVENTION

1. Field of the Invention

The present invention relates to an imaging device having a plurality of image sensors, and in detail relates to an imaging device having a so-called Live View function for switching images acquired by the plurality of image sensors and displaying on a display device.

2. Description of the Related Art

In a conventional digital camera, observation of a photographic subject was performed using an optical viewfinder, but recently there has been proposed a digital camera that does not have an optical viewfinder, and also a camera that uses output of imaging elements provided for storage of photographic image data together with an optical viewfinder in live view display. For example, Japanese patent Laid open No. 2000-175100 discloses an imaging device having a main image sensor for storing a subject image and a sub image sensor for moving pictures, in which an image is displayed based on output of the sub image sensor.

SUMMARY OF THE INVENTION

The present invention has as an object to provide an imaging device having a plurality of image sensors, wherein display regions of display images based on outputs from these image sensors are substantially matched through simple adjustment.

The imaging device of the present invention comprises a photographing lens, a first imaging sensor for taking a subject image formed by the photographing lens, a second image sensor for taking a subject image formed by the photographing lens, an optical path switching section for selectively switching subject light that has passed through the photographing lens to either one of the first image sensor or the second image sensor, a display section for displaying an image taken by the second image sensor, and a display region storage section for storing information representing a region for display on the display section from a region where imaging by the second image sensor is possible, wherein the display section controls the display region based on the information stored in the display region storage section.

DETAILED DESCRIPTION OF THE PREFERRED EMBODIMENTS

In the following, a preferred embodiment using a digital single lens reflex camera having a function as an imaging device adopting the present invention will be described in accordance with the drawings.

Figure 1:
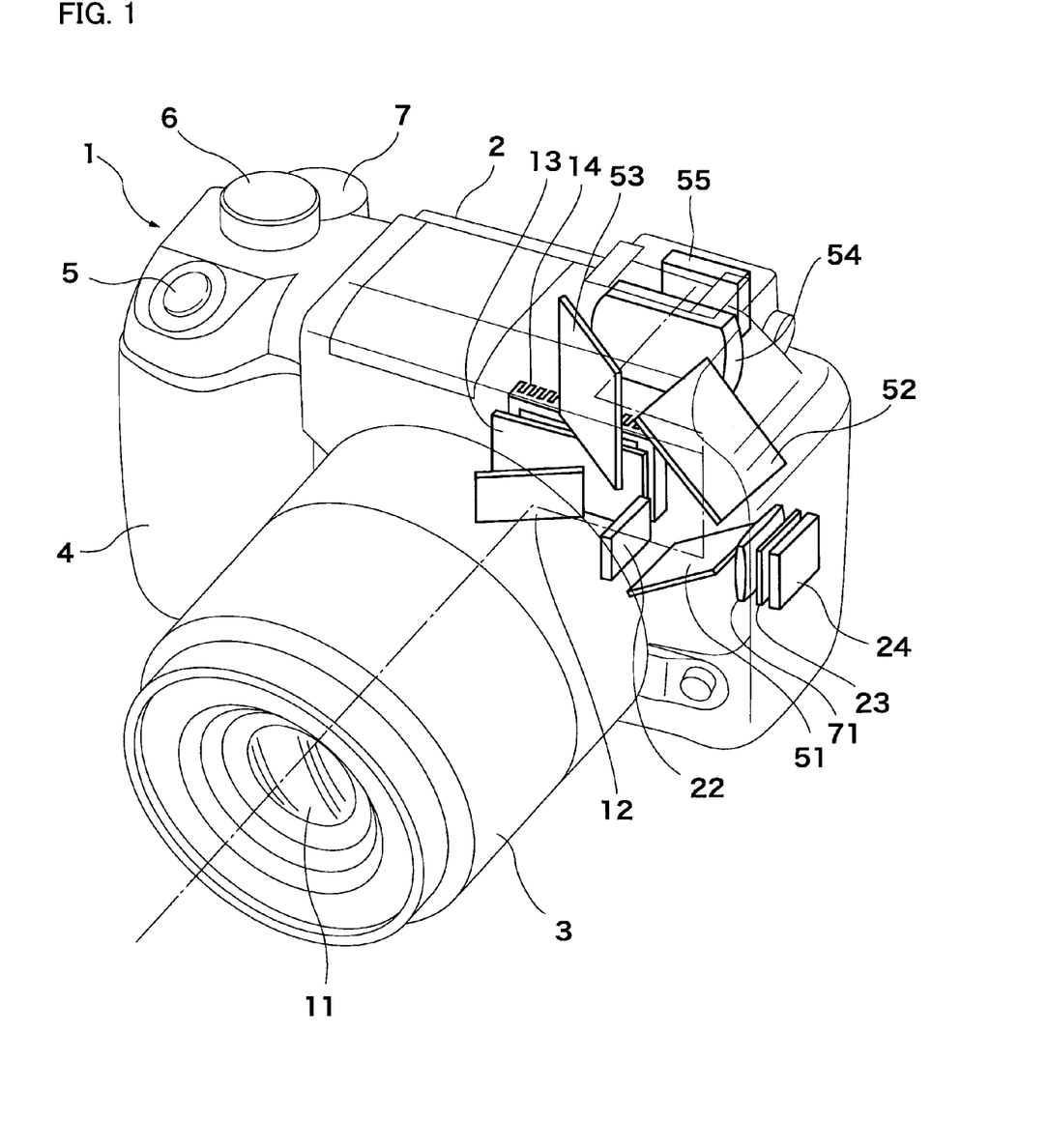
FIG. 1 is an external perspective view including a partial internal optical system of a digital single lens reflex camera of an embodiment consistent with the present invention.

FIG. 1 is an external perspective view of part of a digital single lens reflex camera 1, where a lens barrel 3 internally containing an imaging optical system 11 is removably attached to a front surface side of a camera body 2. Also, a grip section 4 for holding the digital single lens reflex camera 1 is arranged at the left side (on the right looking from the photographer's side) of the camera body 2, and a release button 5 comprising a two stage switch for designating an exposure operation is arranged in an upper part of this grip section 4. This two-stage switch is made up of a first release switch (hereafter referred to as a first release) that is turned on when the release button 5 is pressed down halfway, and a second release switch (hereafter referred to as a second release) that is turned on when the release button 5 is pressed down all the way from this half-pressed state.

A mode dial 6 for setting camera exposure modes is arranged at the upper left (the right side looking from the photographer's view point) of the camera body 2 close to the release button 5. This mode dial 6 is capable of selecting still picture exposure modes and moving picture exposure modes, etc. A control dial 7 for setting various control values etc. is arranged at a rear upper surface of the camera body 2, close to this mode dial 6.

Figure 2:
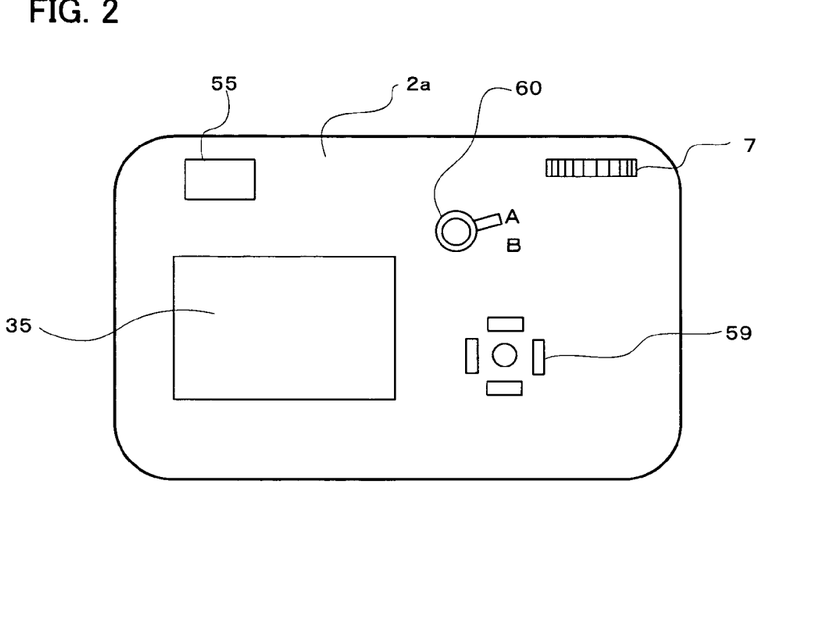
FIG. 2 is a rear view of a digital single lens reflex camera of this embodiment.

As shown in FIG. 2, an LCD (Liquid Crystal Display), being a display device for displaying a live view image or an image stored after exposure (still picture or moving picture) at the time of viewing a subject, is arranged on the rear surface 2a of the camera body 2, slightly to the lower left. The position at which the LCD 35 is arranged on the camera body 2, is not limited to the lower left rear surface as shown in the drawing as long as it is in a position that can be seen by the photographer, and also is not limited to a liquid crystal monitor and can be another display device. A cover glass 55 for protecting an imaging lens 54 of the viewfinder optical system (refer to FIG. 3) is exposed above the LCD 35.

A cross-shaped button 59 for performing operations of moving a cursor on the LCD 35 is arranged to the right side of the LCD 35. This cross-shaped button 59 has respective buttons for up, down, left and right, as shown in the drawings. A display mode switching button 60 for switching between A mode display and B mode display is arranged at an upper side of the cross-shaped button 59, and this display switching button 60 is a switch that can be rotated between two positions of index A and index B. A mode display and B mode display will be described later, but relate to switching of image sensors used in live view display. The above described control dial 7 is arranged above and to the right of the display mode switching button 60, and this mode control dial 7 is exposed at a position where it is capable of being rotatably operated by the thumb of a hand (right hand) grasping the grip section 4.

Returning to FIG. 1, the optical system of the digital single lens reflex camera will now be described. The above mentioned imaging optical system 11 is an optical system for forming the subject light flux into an image, and since it is incorporated into a single lens reflex camera it also serves as part of the viewfinder optical system. A main mirror 12 arranged inside the camera body 2 alternates between a first posture (in FIG. 3 a position of the main mirror 12 shown by a two-dot dashed line) removed from a light path of the imaging optical system 11 in order to allow subject light flux to pass from the imaging optical system 11 to the first image sensor 14, and a second posture (in FIG. 3 a position of the mirror 12 shown by a solid line) for reflecting subject light flux to the second image sensor 24, and is constructed as a so-called quick return mirror. The main mirror 12 is controlled by a CPU (Central Processing Unit) 31, that will be described later, in response to the second release becoming on as a result of the release button 5 being pressed, or an A mode display and B mode display switching operation by the display mode switching button 60.

A low pass filter 13 is arranged behind the rear surface of the main mirror 12, and is an optical filter for removing unnecessary high frequency components from the subject light flux guided to the first image sensor 14. The previously mentioned first image sensor 14 is arranged behind the low pass filter. When the main mirror 12 is in the first posture, a subject image is formed on the first image sensor 14 by the imaging optical system 11 (refer to FIG. 3). This first image sensor 14 is a two dimensional image sensor for photoelectrically converting a subject image to electrical signals and outputting them. Within this embodiment, a CCD (Charge Coupled Device) having a color imaging function for high resolution still image capture has been adopted, but this is not limiting and it is also possible to use a two-dimensional image sensor such as CMOS (Complementary Metal Oxide Semiconductor) etc.

Figure 3:
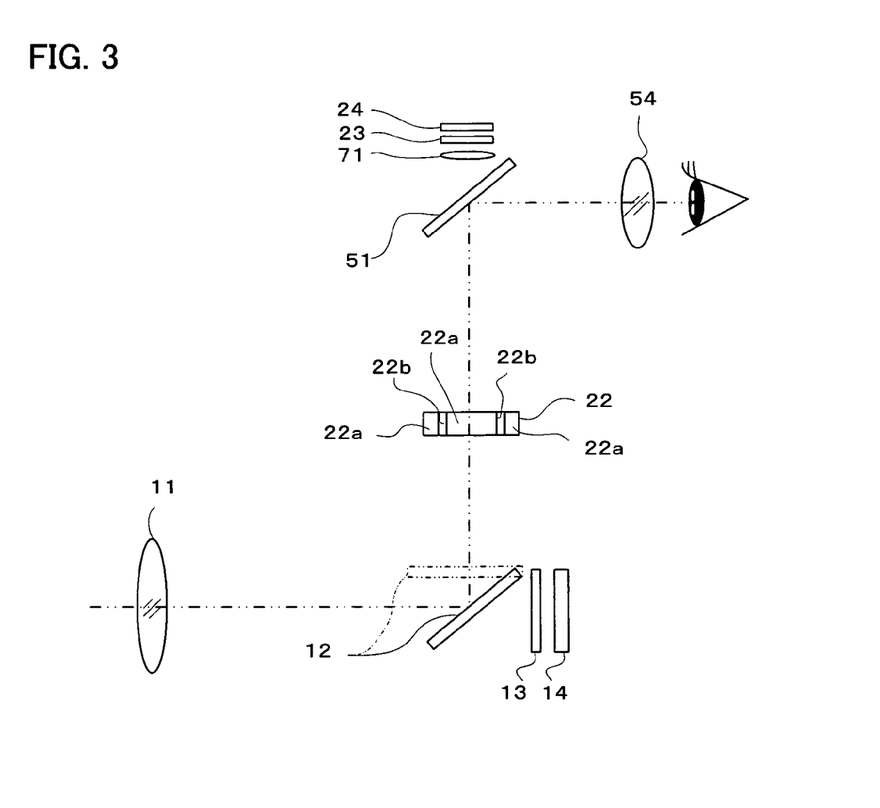
FIG. 3 is a block diagram showing an optical system of a digital single lens reflex camera of this embodiment.

A transmissive screen 22 is arranged to the right side of the main mirror 12 (left side looking from the photographer's view point). This screen 22 is formed of semitransparent optical material, and as shown in FIG. 3 is integrally provided with a target mark 22b for display of a focusing range or metering range on a screen section 22a. The screen 22 is an imaging screen for forming an image of subject light flux that has passed through the imaging optical system 11, and the formed subject image is viewed by means of an eyepiece 55 of the viewfinder optical system. Therefore, the length of a light path from the main mirror 12 to the first image sensor 14 is made the same as the length of a light path from the main mirror 12 to the screen 22. The subject light flux is reflected to the right by the main mirror 12, but in FIG. 3 it is shown as being reflected upwards in the drawing, to simplify the drawing.

A half mirror 51 is arranged at the right side (left side looking from the photographer's view point) of the screen 22, and an imaging lens 71, low pass filter 23 and second image sensor 24 are arranged in that order behind the half mirror 51. The half mirror 51 allows some of the subject light to pass to the second image sensor 24, and reflects the remaining subject light flux to the eyepiece 54 of the viewfinder. The imaging lens 71 is a lens for reforming images of the subject image that has been formed on the screen 22 but this time on the second image sensor 24, and a low pass filter 23 for removing unwanted high frequency components has the same structure and function as the previously mentioned low pass filter 13.

The second image sensor 24 is an image sensor for converting the subject image that is incident via the low pass filter 23 to electrical signals. Within this embodiment a comparatively low pixel CMOS image sensor is used, and is also used together with live view and moving picture exposure. This second image sensor 24 is a so-called single-plate color image sensor, and color separation filters are arranged on the imaging surface of the second image sensor 24. Specifically, a plurality of photodiodes are arrayed on the imaging surface, and one of, for example, a red (R) filter, green (G) filter and blue (B) filter, included in a color separation filter, is arranged corresponding to each photodiode. The filter array may be, for example, a Beyer array. Within this embodiment CMOS has been adopted, but this is not limiting and there is no problem whatsoever with using a CCD image sensor or the like.

A mirror 52 is arranged at an upper part of the half mirror 51, and subject light flux that has been reflected by the half mirror 51 is reflected to the left side (right side looking from the photographer's view point) by this half mirror 52. A mirror 53 is arranged at an upper part of the camera body 2, at the left side of the mirror 52. An eyepiece 54 is arranged at an upper rear surface side of the camera body 2, close to the mirror 53, and the previously described cover glass 55 is also disposed at this rear surface side.

Operation of the optical system of the digital single lens reflex camera of this embodiment constructed as described above will now be described.

First, when the main mirror 12 is in the first posture as shown by the two-dot dashed line in FIG. 3, subject light flux from the imaging optical system 11 is formed into an image on the first image sensor 14 after unwanted high frequency components have been removed by the low pass filter 13. When in this first posture, the subject light flux is not led to the screen 22, which means that no subject light flux is incident on the second image sensor 24, and it is not possible to perform live view display. No subject light flux is led to the eyepiece 54 either, which means that it is also not possible to view the subject image optically.

Next, when the main mirror 12 is put in the second posture as shown by the solid line in FIG. 1 and FIG. 3, the main mirror 12 is rotated to a position where subject light flux is reflected to the side (to the right in FIG. 1). Subject light flux that has been reflected to the right side by the main mirror 12 is formed into an image on the screen 22. This formed subject image is then reformed into an image on the second image sensor 24 by means of the half mirror 51, imaging lens 71 and low pass filter 23. Also, some of the subject light flux is reflected upwards by the half mirror 51, and further reflected to the left by the mirror 52, reflected to a rear section by the mirror 53, and formed into an image on the eye of the photographer by means of the eyepiece 54, and in this way the subject image can be viewed. As a result, when the main mirror 12 is put in the second posture, the subject light flux is not led to the first image sensor.

Figure 4:
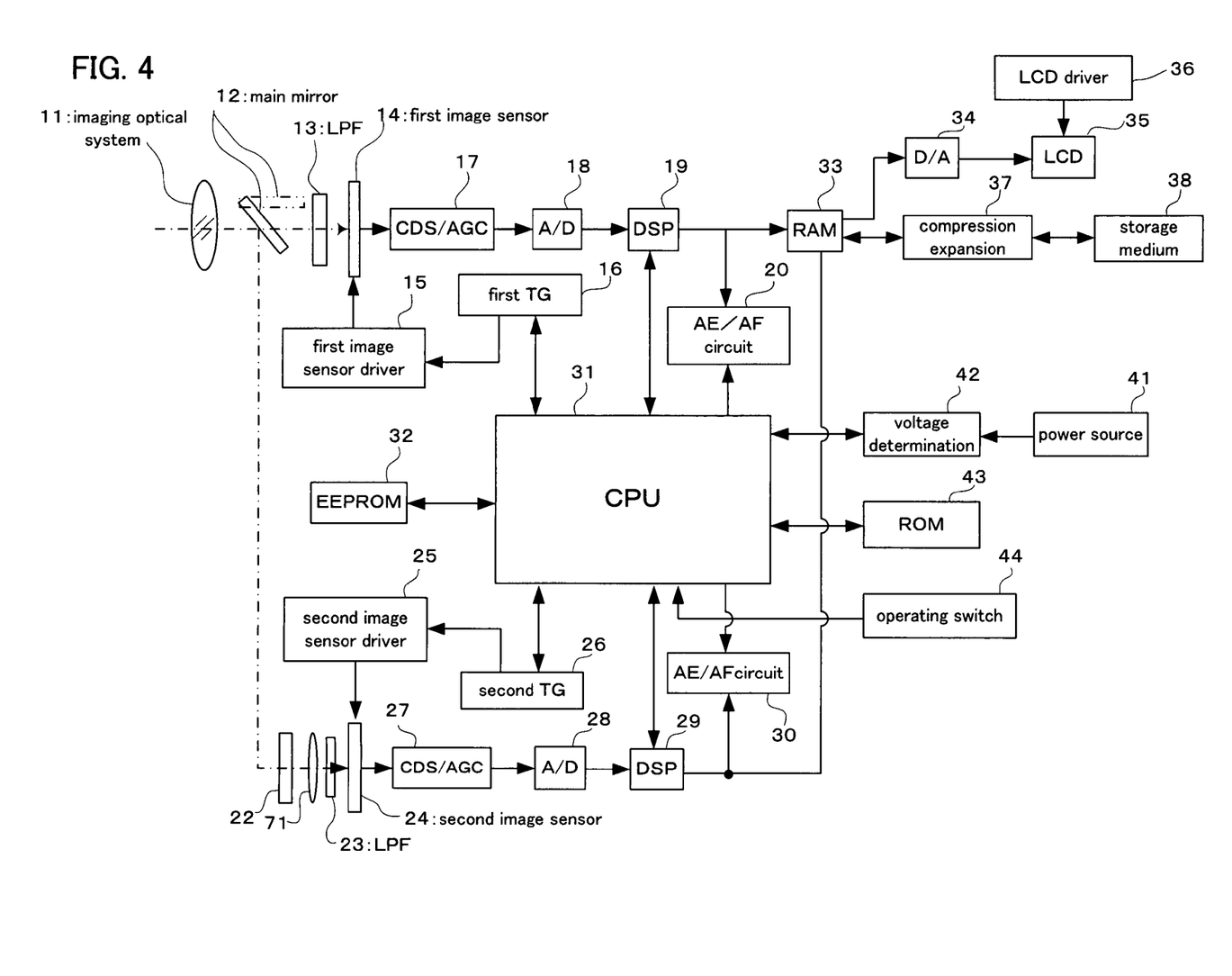
FIG. 4 is a block diagram showing an electrical system of a digital single lens reflex camera of this embodiment.

Next, the electrical structure will be described using the block structural diagram of this embodiment shown in FIG. 4. The first image sensor 14, receiving subject light flux from the previously described imaging optical system 11 via the low pass filter 13, is connected to a first image sensor driver 15, this first image sensor driver 15 being a circuit for controlling and driving the first image sensor 14. This first image sensor driver 15 is connected to a first TG 16, this first TG 16 being a circuit for supplying signals for controlling timing of the first imaging driver 15. The first image sensor 14 is also connected to a CDS/AGC circuit 17, and this CDS/AGC circuit 17 is a signal processing circuit for carrying out noise removal and amplification processing on output signals from the first image sensor 14.

Output of the CDS/AGC circuit 17 is connected to an A/D conversion circuit 18, the A/D conversion circuit 18 being a signal processing circuit for converting analog signals output from the CDS/AGC circuit 17 to digital signals. Output of the A//D conversion circuit 18 is connected to a DSP 19, this DSP 19 being a signal processing circuit for carrying out specified digital signal processing based on control signals from a CPU 31. Output of the DSP 19 is connected to an AE/AF circuit 20, this AE/AF circuit 20 carrying out calculations for exposure control (AE) and calculations for auto focus (AF) control based on digital image signals output from the DSP 19.

The second image sensor 24, receiving subject light flux from the previously described imaging optical system 11 that is reflected by the main mirror 12 via the imaging lens 71 and the low pass filter 23, is connected to a second image sensor driver 25, this second image sensor driver 25 being a circuit for controlling and driving the second image sensor 24. The second image sensor driver 25 is connected to a second TG 26, this second TG 26 supplying signals for controlling timing of the second imaging driver 25. The second image sensor 24 is also connected to a CDS/AGC circuit 27, and this CDS/AGC circuit 27 is a signal processing circuit for carrying out noise removal and amplification processing on signals from the second image sensor 24.

Output of the CDS/AGC circuit 27 is connected to an A/D conversion circuit 28, this A/D conversion circuit 28 being a signal processing circuit for converting analog signals output from the CDS/AGC circuit 27 to digital signals. Output of the A/D conversion circuit 28 is connected to a DSP 29, this DSP 29 being a signal processing circuit for carrying out specified digital signal processing based on control signals from a CPU 31. Output of the DSP 29 is connected to an AE/AF circuit 30, this AE/AF circuit 30 carrying out calculations for exposure control (AE) and calculations for auto focus (AF) control based on digital image signals output from the DSP 29.

An EEPROM (Electrically Erasable Programmable Read-Only Memory) 32 connected to the CPU 31 is a non-volatile electrically rewritable storage medium. Various correction data used in this digital single lens reflex camera, such as, for example, information representing a range for displaying images formed by the second image sensor 24 as will be described later, and various correction data required for exposure control and auto focus processing, etc. is written to this EEPROM 32 at the time of manufacture.

A RAM (Random Access Memory) 33 connected to the previously described DSP 19 and DSP 29 is storage means constructed as a frame buffer for temporarily storing signals from the DSP 19 and DSP 29. Whether imaging is carried out by the first image sensor 14 or imaging is carried out by the second image sensor 24 is alternately selected by putting the main mirror 12 in the first posture or the second posture, and so either an output signal from the DSP 19 or an output signal from the DSP 29 is stored in the RAM 33.

A compression/expansion circuit 37 connected to the RAM 33 subjects digital image data temporarily stored in the RAM 33, to compression processing such as JPEG (Joint Photographic Coding Experts Group), when an image is to be stored, or subjects compressed image data stored in the storage medium 38 to expansion processing for display. The compression expansion circuit 37 is connected to a storage medium 38, and either image data that has been compressed by the compression/expansion circuit 37 is stored therein, or image data stored in the storage medium 38 is output to the compression/expansion circuit 37. This storage medium 38 is constructed as a removable memory card, etc.

The previously described RAM 33 is connected to a D/A conversion circuit (digital to analog conversion circuit) 34, and the D/A conversion circuit 34 converts digital data stored in the RAM 33 to analog signals so as to be able to display on the LCD 35. The output of the D/A conversion circuit 34 is connected to the previously described LCD 35, and display is performed on the LCD 35 based on analog signals converted by the D/A conversion circuit 34.

This LCD 35 is connected to an LCD driver 36, and the LCD driver 36 performs display control of the LCD 35. Besides display of subject images, the LCD 35 is also used for display when performing exposure mode settings or menu settings. A display region of the LCD 35 based on output of the first image sensor 14 is adjusted at the time of assembly at the factory so that it matches a display region of the optical viewfinder that is viewed by the photographer through the eyepiece 54.

A power supply 41 supplies electrical power to drive sources for various circuits and motors of the digital single lens reflex camera 1, and is constituted by, for example, a secondary battery. A source voltage of this power supply 41 is input to a voltage determination circuit 42, and the source voltage is determined. The voltage determination result is output to the CPU 31, and if it is greater than or equal to a specified source voltage the camera is controlled so as to operate. A ROM (Read Only Memory) 43 connected to the CPU 31 is a non-volatile storage medium storing firmware, which is a program for controlling operation of this digital single lens reflex camera 1.

An operating switch 44 connected to the CPU 31 performs operations such as switching the modes of the digital single lens reflex camera 1 (for example, switching of exposure modes and switching of image quality modes), and exposure operation start, and serves as input means constituted by a plurality of switch types. The previously described release button 5, mode dial 6, control dial 7, cross-shaped button 59 and display mode switching button 60 are included in this operating switch 44. The CPU 31 is connected to the previously described first TG 16, DSP 19, AE/AF circuit 20, second TG 26, DSP 29, AE/AF circuit 30, EEPROM 32, voltage determination circuit 42, ROM 43 and operating switch 44, wherein it serves as a controlling circuit for control of the whole of the digital single lens reflex camera 1, and is constituted by a microprocessor.

Figure 5:
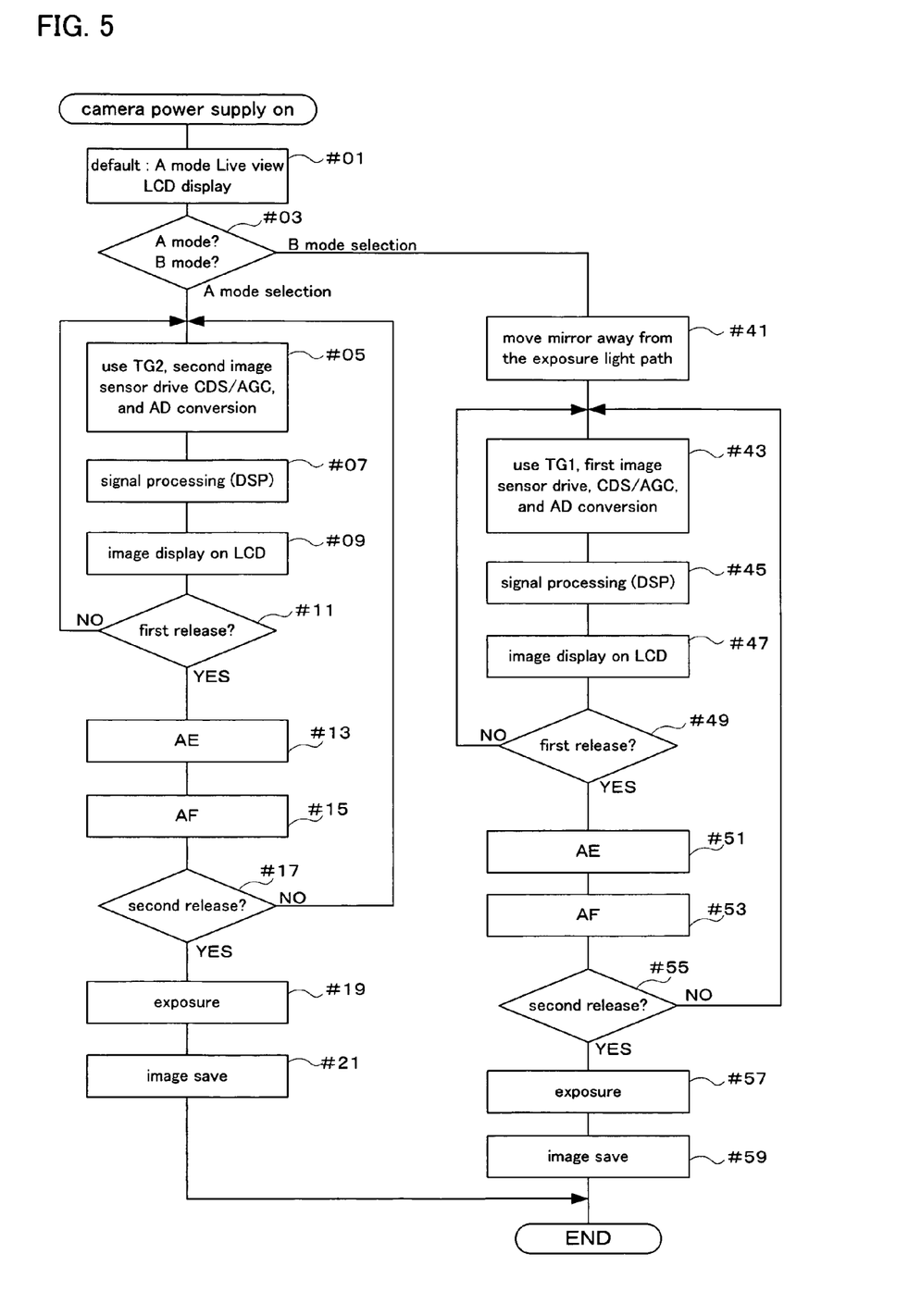
FIG. 5 is a flowchart showing an exposure operation of a digital single lens reflex camera of this embodiment.

Next, operation of the digital single lens reflex camera 1 of this embodiment will be described using the flowchart shown in FIG. 5.

First, if the power supply of the digital single lens reflex camera 1 is turned on, the processing of this flowchart commences, and A mode live view LCD display is selected as a default value (#01). In this state, subject light flux that has passed through the imaging optical system 11 is reflected by the main mirror 12 that is in the second posture, and formed into an image on the screen 22. The subject image formed on the screen 22 is then further reflected by the half mirror 51 and the mirrors 52 and 53. After that, the subject image is formed into an image on the eye of the photographer through the eyepiece 54 and the cover glass 55. In this way, the photographer can optically view the subject image.

Next, the status of the display mode switch 60 is detected (#03), and if A mode is selected processing advances to step #05. This A mode display is a mode for displaying a subject image that has been formed by the second image sensor 24 on the LCD 35 provided on the rear surface of the camera. In this mode, since the main mirror 12 is rotated onto the optical axis of the imaging optical system 11, subject light flux is not guided to the first image sensor 14. On the other hand, a subject image formed on the screen 22 by subject light flux that has been guided by the main mirror 12 passes through the half mirror 51 and forms an image on an imaging surface of the second image sensor 24 by way of the low pass filter 23.

Further, in step #05, the second image sensor driver 25 drives the second image sensor 24 using a clock supplied from the second TG 26, and photoelectric conversion of the subject image is carried out. In this manner, analog image signals are output from the second image sensor 24 at a specified frame rate. At the time of live view display in A mode, the first TG 16 does not output signals to the first image sensor driver 15, and the first image sensor is not driven.

Image signals for every frame are input to the CDS/AGC circuit 27. Well known correlated double sampling or the like is carried out by a CDS circuit section within the CDS/AGC circuit 27. Reset noise is removed, and at the same time amplification to a specified signal level is carried out by an AGC circuit section within the CDS/AGC circuit 27. These signals are then output. Analog image signals from the CDS/AGC circuit 27 are then converted to digital image signals (image data) by the A/D conversion circuit 28.

Once each of the processes in step #05 are completed, processing advances to step #07, and DSP signal processing is carried out. The DSP 29 performs specified image processing on the image data output from the A/D conversion circuit 28, and performs auto white balance processing on the image data based on obtained calculation results. Once DSP signal processing is complete, display on the LCD 35 is carried out (#09). Image data that has been subjected to processing by the DSP 29 is temporarily stored in the RAM 33. Image data stored in the RAM 33 is converted to analog data by the D/A conversion circuit, and then live view display is carried out using the LCD 35 driven by the LCD driver 36.

In this way, a subject image formed by the second image sensor 24 is displayed on the LCD 35, and the photographer can carry out framing while viewing the subject image on the LCD 35. When displaying the subject image on the LCD 35 in A mode, it is desirable for the B mode and A mode display ranges to coincide, and therefore at the time of manufacture of individual single lens reflex cameras an adjustment value for making the display ranges coincident is obtained, and stored in the EEPROM 32. In step #09, this adjustment value is read out, and image data is read out so that the display range is made coincident with that in B mode. The way in which the adjustment value is obtained, and image display performed using this adjustment value, will be described later.

It is then determined whether or not the release button 5 has been pressed halfway, that is, whether or not the first release is turned on (#11). When the first release has not been operated and is off, step #05 is returned to, and the previously described steps are repeated. If the first release has been operated and is on, processing advances to step #13, where AE processing is carried out. In this step, using image data that has been processed by the previously described DSP 29, the AE/AF circuit 30 calculates a brightness value for image data of one frame (one screen) and performs processing such as weighted addition to calculate an AE average value corresponding to the brightness of the subject, and outputs the calculated result to the CPU 31. Calculation of exposure control values such as shutter speed and aperture value is carried out by the CPU 31 using this AE average value. Also, correction data is read out from the EEPROM 32 and exposure calculation is carried out.

If AE calculation is complete, processing advances to step #15 where AF processing is carried out. In this step, using image data for one frame the AE/AF circuit 30 extracts high frequency components in the brightness component using a high pass filter or the like, and by calculating a cumulative sum value for the extracted high frequency component or the like an AF average value corresponding to an outline component or the like of a high frequency area side is calculated, and the calculated result is output to the CPU 31.

The CPU 31 performs focusing of the imaging optical system 11 based on this AF average value. When performing this focusing operation, correction data is read out from the EEPROM 32 and focus detection calculation is carried out. In this embodiment focus detection is performed using a high frequency component of the subject image, but this is not limiting and it is also possible to use a known focus detection unit such as a phase difference method, for example.

Processing next advances to step #17, where it is determined whether or not the release button 5 has been pressed down fully, that is, whether or not the second release is on. When the second release has not been operated and is off, step #05 is returned to, and the previously described steps are repeated. If the second release has been operated and is on, processing advances to step #19 for executing exposure operation. First, the main mirror 12 is taken out of the exposure light path so as to be changed from the second posture to the first posture. If the main mirror 12 is in the first posture, subject light flux from the imaging optical system 11 is formed into an image on the imaging surface of the first image sensor 14 by way of the low pass filter 13.

Then, the first image sensor driver 15 drives the first image sensor 14 on the basis of a clock supplied from the first TG 16, and photoelectric conversion of the subject image is carried out. Analog image signals from the first image sensor 14 are output in frame units. At this time, the second TG 26 does not output to the second image sensor driver 25 and the second image sensor 24 is not driven. Image signals output from the first image sensor 14 are the same as for the case of the second image sensor 24, and are respectively processed by the CDS/AGC circuit 17, A/D conversion circuit 18, and DSP 19, and stored in the RAM 33.

If the exposure operation is completed, there is a transfer to an image saving step (#21). Digital image data stored in the RAM 33 is compressed using a JPEG format, for example, by a compression circuit section inside the compression/expansion circuit 37, then stored in the storage medium 38, thus completing display and exposure operation in A mode.

The above described operations are for the case where still image exposure mode has been selected with the mode dial 6, and if moving picture exposure mode is selected the operations are the same as for still image exposure mode up to the point where the second release is turned on. If the second release is turned on, digital image data that varies over time based on image signals read out sequentially from the first image sensor 14 is stored in the storage medium 38, and at the same time a subject image that varies over time is displayed on the LCD 35.

Returning to step #03, if the display mode switching button is set to B mode, processing advances to step #41 and B mode display is carried out. In B mode display, the main mirror 12 is rotated so as to be taken out of the exposure light path (position shown by the two-dot dashed line in FIG. 3), and subject light flux from the imaging optical system 11 is formed into an image on the image sensor 14. This formed subject image is imaged by the image sensor 14 and the subject image is displayed on the LCD 35. In this mode, if the second release is turned on, image signals imaged by the first image sensor 14 are subjected to specified signal processing and stored in the storage medium 38 as a still image.

If processing transfers to step #41, first the main mirror 12 is taken out of the exposure light path, and the subject image is formed on the first image sensor 14. At this time, no subject image is formed on the second image sensor 24. After that, processing advances to step #43, image signals are read out from the first image sensor and digital image data is generated. In order to do this, first of all the first image sensor driver 15 drives the first image sensor 14 using a clock supplied from the first TG 16, and photoelectric conversion of the subject image is carried out. Analog image signals are then output from the first image sensor 14 at a specified frame rate.

At the time of live view display in B mode, the second TG 26 does not output signals to the second image sensor driver 25, and the second image sensor 24 is not driven. Image signals for every frame are input to the CDS/AGC circuit 17. Well known correlated double sampling or the like is carried out by a CDS circuit section within the CDS/AGC circuit 17. Reset noise is removed, and at the same time amplification to a specified signal level by an AGC circuit section within the CDS/AGC circuit 17. Output of these signals is carried out in the same way as for A mode. Analog image signals from the CDS/AGC circuit 17 are then converted to digital image signals (image data) by the A/D conversion circuit 18. After that, processing advances to step #45, and DSP signal processing is carried out similarly to step #07.

Next, live view display is performed on the LCD 35 based on image data temporarily stored in the RAM 33 (#47). The operation here is the same as for the previously described step #09, and detailed description will be omitted. In A mode, together with carrying out live view display using the LCD 35, it was possible to optically view the subject image by means of the eyepiece 54, but in B mode the main mirror 12 is in a state removed from the exposure light path, and not in a position to lead subject light flux to the second image sensor 24, which means that the eyepiece is blanked out and it is not possible to optically view the subject image. However, the photographer can view the subject image in a similar state to when stored in the storage medium 38, which means that the stored subject image has the merit that it is more recent than B mode display.

Processing next advances to step #49, where it is determined whether or not the release button 5 has been pressed down halfway, that is, whether or not the first release is on. When the first release has not been operated and is off, step #43 is returned to, and the previously described steps are repeated. If the first release is operated and is on, processing advances to step #51 where AE processing is carried out, and once AE calculations are completed, processing advances to step #53 where AF processing is carried out. The AE processing in step #51 and the AF processing in step #53 are the same as the previously described AE processing and AF processing of step #13 and step #15 respectively, and so detailed description will be omitted.

It is then determined whether or not the release button 5 has been pressed fully down, that is, whether or not the second release is turned on. When the second release has not been operated and is off, step #43 is returned to, and the previously described steps are repeated. If the second release has been operated and is on, processing advances to step #57 for executing exposure operation. In A mode, the main mirror 12 is driven from the second posture to the first posture, but in B mode the main mirror has already been removed from the exposure light path in step #41, so this operation is not required. As previously described, in B mode, subject light flux from the imaging optical system 11 is formed into an image on the imaging surface of the first image sensor 14 by way of the low pass filter 13.

Then, the first image sensor driver 15 drives the first image sensor 14 on the basis of a clock supplied from the first TG 16, and photoelectric conversion of the subject image is carried out. Analog image signals from the first image sensor 14 are output in frame units. At this time, the second TG 26 does not output to the second image sensor driver 25 and the second image sensor 24 is not driven.

Image signals output from the first image sensor 14 are the same as for the case of the second image sensor 24, and are respectively processed by the CDS/AGC circuit 17, A/D conversion circuit 18, and DSP 19, and stored in the RAM 33. If the exposure operation is completed, there is a transfer to an image saving step (#59). Digital image data stored in the RAM 33 is compressed using a JPEG format, for example, by a compression circuit section inside the compression/expansion circuit 37, then stored in the storage medium 38, thus completing display and exposure operation in B mode.

Figure 6:
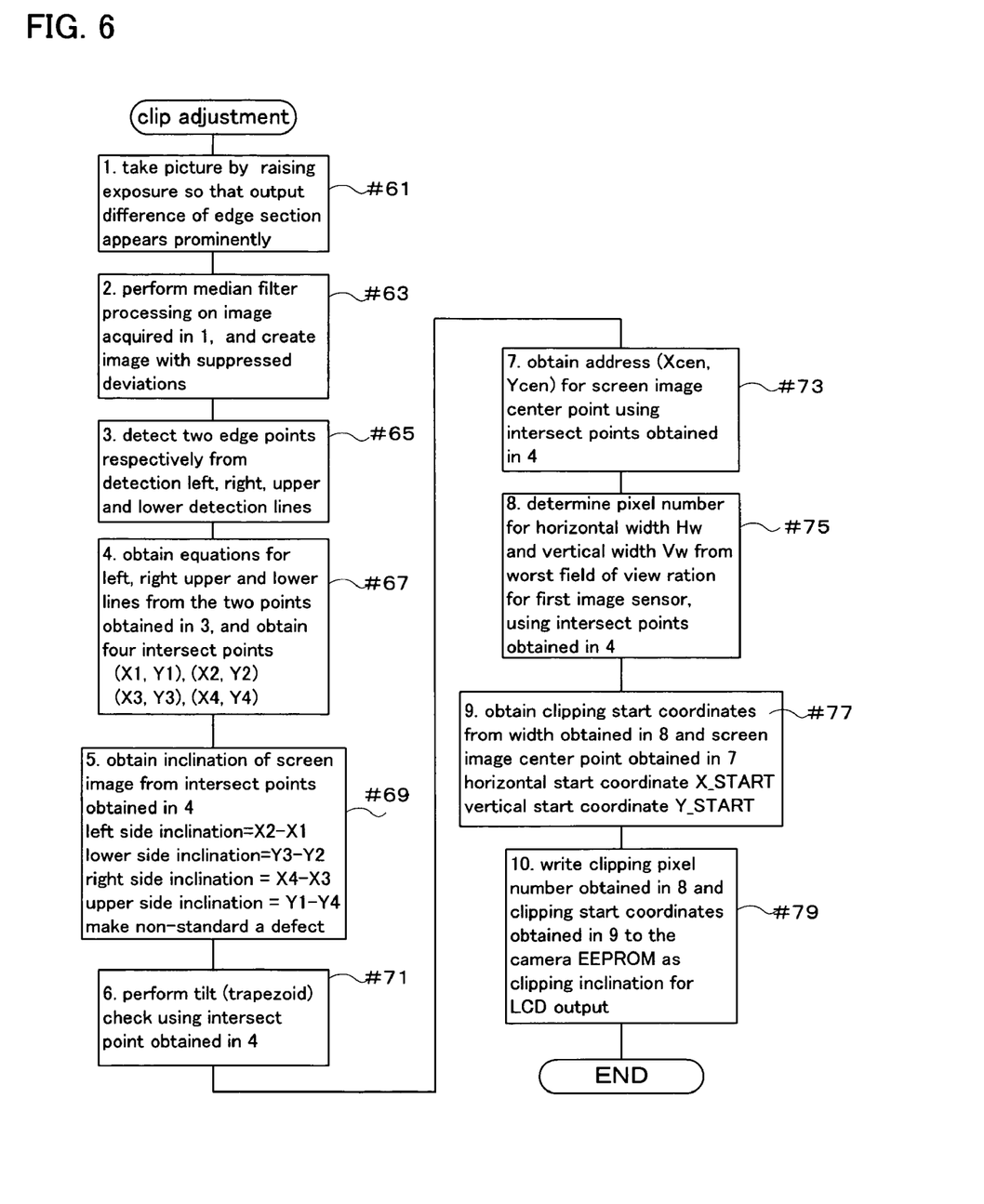
FIG. 6 is a flowchart showing clipping adjustment of a digital single lens reflex camera of this embodiment.
Figure 7A:
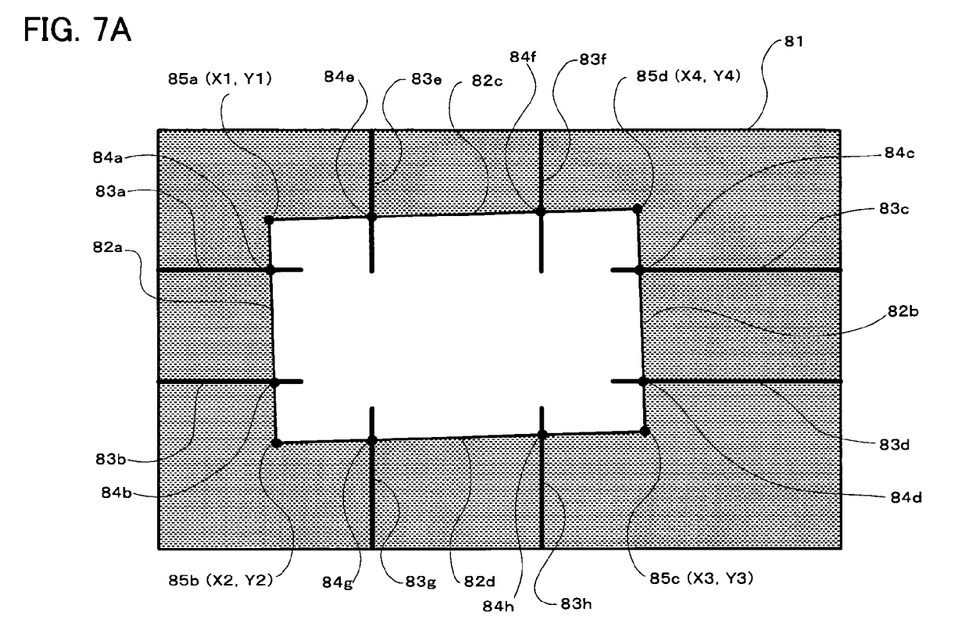
FIGS. 7A and 7B are drawings for describing the general concept of incremental adjustment in this embodiment, with FIG. 7A showing the case of obtaining intersect points of four sides of a display region and FIG. 7B the case of obtaining center points, in order to obtain read out start coordinates, horizontal width, and vertical width.
Figure 7B:
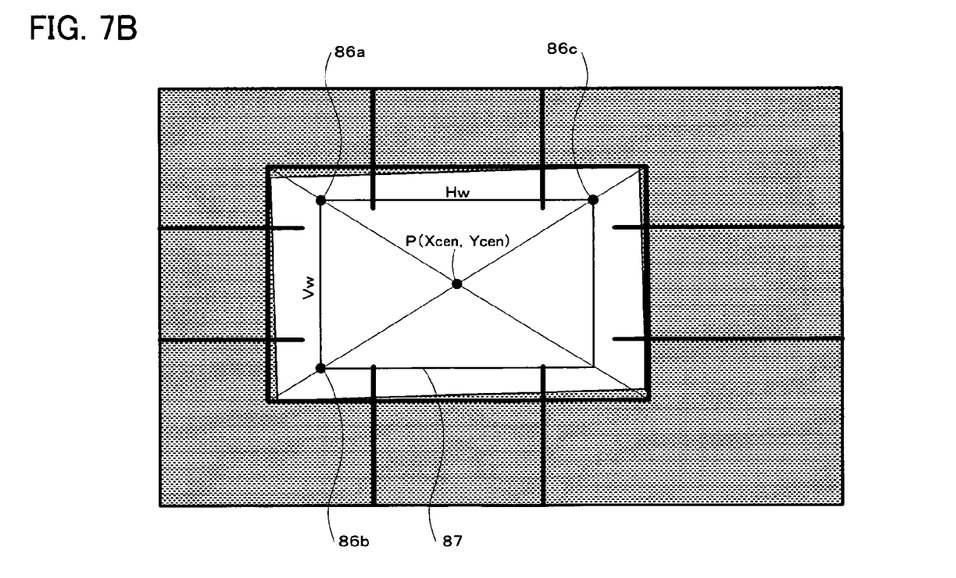

Next, description will be given, using FIG. 6, FIG. 7A and FIG. 7B, of detecting an adjustment value for causing the display ranged for A mode and B mode to substantially coincide. This adjustment value detection operation is carried out at the time of assembling the digital single lens reflex camera at the factory.

First, for output of the second image sensor 24, imaging is carried out with an amplification factor raised so that a difference of edge sections becomes prominent (#61). If imaging is carried out, as shown in the schematic diagram of FIG. 7A, an image forming range 81 of the second image sensor 24, and edge sections of display ranges 82a, 82b, 82c and 82d of the subject image appear, and so amplification factor is adjusted so that the edge sections become clearly defined.

Then, in order to simplify detection of the edge sections, median filter processing is carried out on an image acquired in step #61, to give image data in which pixel defects and output deviations are suppressed. The median filter processing carried out here indicates processing to select a median value of a plurality of items of sequential image data, while varying the selection range.

Two detection lines 83a and 83b, 83c and 83d, 83e and 83f, and 83g, and 83h, for each edge of the subject image display ranges 82a, 82b, 82c and 82d are determined, and intersect points of respective edges of the detection lines, that is edge points 84a, 84b, 84c, 84d, 84e, 84f, 84g and 84h are detected (#65). These edge points 84a, 84b, 84c, 84d. 84e, 84f, 84g and 84h are detected by obtaining addresses of points where image data that has been subjected to the above described median filter processing exceeds a specified threshold value.

Next, linear equations for the four left, right, upper and lower sides of the display ranges 82a, 82b, 82c and 82d are obtained, coordinates (addresses) of the intersect points 85a, 85b, 85c and 85d of the four sides are obtained, and the respective coordinates are made (X1,Y1), (X2,Y2), (X3,Y3) and (X4,Y4) (#67).

In step #67, inclination of each straight line is then obtained from the coordinates (X1, Y1), (Y2, X2), (X3, Y3) and (X4, Y4) of the obtained intersect points, based on the following equations.

inclination of left side (82a)=$X2-X1$ inclination of right side (82b)=$X4-X3$ inclination of upper side (82c)=$Y1-Y4$ inclination of lower side (82d)=$Y3-Y4$ If the inclinations of the straight lines obtained in this manner are outside a predetermined range of values, it is determined to be a non-standard defective unit, and excluded (#69).

Processing then advances to step #71, where a tilt (trapezoid) check is carried out based on the coordinates of the intersect points obtained in step #67. This is a check as to whether or not a difference between inclinations of the left and right straight lines is within a predetermined range, and whether or not a difference between the inclinations of the upper and lower straight lines is within a predetermined range. This check determines whether or not a display range is distorted due to mechanical fitting errors and optical errors, and rejects it if it is a non-standard defective unit.

Next, coordinates (address) for a center point P in the display range are obtained based on coordinates of the intersect points obtained in step #67, and made (Xcen, Ycen) (#73). This can be done by respectively obtaining a line linking the intersect point 85a and the intersect point 85c, and a line linking the intersect points 85b and the intersect point 85d, and obtaining an intersect point of these two lines. The method of detecting the center point P is not limited to the method just described, and there are various other methods such as obtaining a quadrilateral that is parallel to the imaging range of the second image sensor 24 that inscribes the display range, and obtaining a center point from coordinates of this quadrilateral.

Processing then advances to step #75, where horizontal width Hw and vertical width Vw are obtained from the worst field of view factor of the second image sensor calculated from variations in optical magnification factor and mechanical deviations. This is computed using of the widths of a display region displayed on the LCD 35 based on output of the second image sensor 24, taking into consideration the field of view factor of the optical viewfinder image seen through the eyepiece 54, and the field of view factor displayed on the LCD 35 based on output of the first image sensor 14. First, if field of view factor of the optical viewfinder is taken into consideration:

$$Hw(\text{viewfinder})=[\{(X4-X1)+(X3-X2)\}/2]$$

$$Vw(\text{viewfinder})=[\{(Y2-Y1)+(Y3-Y4)\}/2]$$

Hw (viewfinder) and Vw (viewfinder) are each multiplied by a field of view factor displayed by the LCD 35 based on the output of the first image sensor 14, thus obtaining the horizontal width Hw and the vertical width Vw, respectively. Here, each width is obtained as a number of pixels.

Next, processing advances to step #77, where read out coordinates (horizontal start coordinates Xstart and vertical start coordinates Ystart) 86a when reading out image data are obtained. This is computed using the center point P obtained in step #73, and the horizontal width Hw and the vertical width Vw obtained in step #75. Specifically, the horizontal start coordinate Xstart is a coordinate calculated by subtracting half of the horizontal width Hw from the X coordinate of the center point P, and the vertical start coordinate Ystart is a coordinate calculated by subtracting half of the vertical width Vw from the Y coordinate of the center point P. Then, the horizontal width Hw and vertical width Vw obtained in step #75, and the horizontal and vertical start coordinates Xstart and Ystart obtained in step #77 are written to the EEPROM 32, and this particular processing flow is terminated.

Next, a method of displaying the subject image on the LCD 35 in step #09 in FIG. 5 using adjustment values stored in the EEPROM 32 as described previously will be described.

First, three factory stored adjustment values, namely horizontal width Hw, vertical width Vw and readout start coordinated (Xstart, Ystart) are read out from the EEPROM 32. Digital image data stored in the RAM 33 is data corresponding to the imaging range 81 of the second image sensor 24. When reading out the digital image data stored in the RAM 33, it is determined, using the three items of data stored in the EEPROM 32, whether or not each of the items of image data is image data within a clipping region.

If the result of determination is that the data is within this region, they are output to the D/A conversion circuit 34, while if the are image data outside the clipping region they are not output to the D/A conversion circuit 34. The LCD driver 36 performs display control so that the output image data is correctly fitted within the range of the display surface of the LCD 35.

In this embodiment, a display range of the optical viewfinder that can be viewed by the photographer through the eyepiece 54, and a display range of a subject image displayed on the LCD 35 based on output of the first image sensor 14, are adjusted at the time of assembly at the factory so that they match. Also, since adjustment values are determined in accordance with the clipping adjustment flowchart shown in FIG. 6, the subject image display range displayed on the LCD 35 based on output of the second image sensor 24, and the subject image display range displayed on the LCD 35 based on output of the first image sensor 14 are substantially matched. Accordingly, the subject image display range for the optical viewfinder and the subject image display range based on output from the first image sensor 14 and the second image sensor 24 are substantially matched.

With the clipping adjustment of this embodiment, since the display range is detected from the display range of the second image sensor 24, a center point P, horizontal width and vertical width of that display range are obtained, and from these values the horizontal width Hw, vertical width Vw and read start position (Xstart, Ystart) are written to the EEPROM 32, in order to substantially match the display ranges of the first image sensor 14 and the second image sensor 24. Therefore, it is possible to electrically adjust a display range to the LCD 35 of the second image sensor that differs for each finished product. Also the adjustment of this embodiment is achieved by causing the center points of the display regions of the first image sensor 14 and the second image sensor 24 to match, which means that there is an advantage in that a feeling of overlapping in displayed images can be reduced.

Also, since adjustment values written to the EEPROM 32 are completed with three items of data, namely the horizontal width Hw, vertical width Vw and read start position (Xstart, Y start), there is the advantage that it is possible to reduce the data amount of the adjustment values. With this embodiment, the adjustment values are exemplified by the above described three items of data, but this is not limiting, and it is also possible, for example, to have three items of data such as read start coordinate 86a, X direction read completion coordinate 86c, and Y direction read completion coordinate 86b. In this case, at the time of obtaining the adjustment values, calculation is possible if the above described center point P coordinates (Xcen, Ycen), horizontal width Hw, and vertical width Vw are used, and when image data is read out from the RAM 33 read is performed from image data corresponding to the read start coordinates, and it is possible to perform read operations if there is data within the range of the X direction read completion coordinate 86c and the Y direction read completion coordinate 86b.

Within this embodiment, a CCD is used as the second image sensor 24, which means that at the time of live view display all image data based on CCD output is temporarily stored in the RAM 33, and when displaying on the LCD 35 only required image data are selectively output from the RAM 33. However, if CMOS is used as the image sensor, when image data is readout from the CMOS, it is possible to make a determination as to whether or not the data is within a specified display region, and read out only required image data. In this case, there is no longer any need to read out all image data, and there is the advantage that it is possible to reduce the read time.

Also, within this embodiment, the main mirror 12 is constructed as a movable mirror that can be removed from the light path of the imaging optical system 11, but this is not limiting and it is also possible to be a fixed half mirror. In this case, by making the main mirror a half mirror, there is the merit that because the light path is divided by switching light paths the light amount is reduced, but there is no need for any moving parts.

Also within this embodiment, a light path to the second image sensor 24 and the eyepiece 54 of the viewfinder is divided by the half mirror 51, but it is also possible to make this a movable mirror. In the case of a movable mirror, when performing live view display using the second image sensor 24, it is possible to remove the movable mirror, while when light flux is guided to the eyepiece 54 of the viewfinder the movable mirror is rotated to a reflecting position. If this method is adopted, at the time of live view display using A mode there is a disadvantage that it becomes impossible to view the subject image using the optical viewfinder, but there is the merit that there is no reduction in light amount, and it is possible to view the subject image on a bright screen.

Since this embodiment is provided with a display section (LCD 35) for displaying an image formed by the first image sensor 14 and the second image sensor, and a display region storage section (EEPROM 32) for storing information representing a region for display on the display unit from a region of the second image sensor where images can be formed, it is possible to make a display region of the first image sensor and a display region of the second image sensor to be displayed on the display section match.

Also within this embodiment, since a screen is provided for forming a subject image that has passed through the imaging lens into an image, and the second image sensor 24 forms an image of the subject image formed on this screen, it is possible to reliably display an image of a specified region based on display region information, even if errors arise in assembly of the screen.

Further, with this embodiment, since an imaging lens is provided for guiding a subject image displayed on the screen to the photographer's eye, as well as being able to conform the subject using the optical viewfinder before taking a picture, it is also possible to provide an imaging device for a single lens reflex camera that can display an electronic image on the display section.

Still further, with this embodiment, since the screen has a rectangular display section, and together with storing information of a specified rectangular region having intersect points of two diagonal lines of a rectangular display section corresponding to the screen in a display region information storage section, position of an image formed on the screen and position of an image formed using the first image sensor are subjected to predetermined adjustments; therefore, it is possible to easily align a positional relationship between an image formed by the first image sensor and an image displayed on the display section.

Within this embodiment, the display region storage section (EEPROM 32) is provided for storing adjustment values in order to adjust an image display region based on output of a first or second image sensor so that a display region based on output of the first image sensor and a display region based on output of the second image sensor match, and since the display unit (LCD 35) has a display region controlled based on the adjustment values stored in the display region storage section, no deviations arise in the subject images based on output of the first image sensor and the second image sensor, and it is possible to carry out live view display without any uncomfortable sensation.

Also, since the adjustment values are determined so that a display center of an image based on output of the first image sensor substantially matches a display center of an image based on output of the second image sensor, a magnification factor of optical systems for subject image flux to the first image sensor and the second image sensor temporarily differ, and even if the sizes of the images do not match it is possible to carry out live view display with uncomfortable sensation reduced because of the centers of the display ranges.

Further, the display region storage section stores clipping start position information for a display region for displaying based on output of the first and second image sensors, display region horizontal width information, and display region vertical width information as adjustment values, which means that there is the advantage that storage of adjustment values can be completed with a small storage amount.

Further, since the display region storage section stores position information corresponding to three points within four corners of a display region for displaying based on output of the first and second image sensors, within this embodiment there is also the advantage that storage of adjustment values can be completed with a small storage amount.

The embodiment described above is exemplified as the present invention applied to a digital single lens reflex camera, but the present invention is not limited to a digital single lens reflex camera, and can be applied to any imaging device that as a plurality of image sensors, and displays an image using output of the image sensors. For example, an imaging device such as an ordinary compact digital camera or a digital camera incorporated into a portable phone.

What is claimed is:

1. An imaging device, comprising:
a photographing lens;
a first imaging sensor for taking a subject image formed by the photographing lens;
a second imaging sensor for taking a subject image formed by the photographing lens;
an optical path switching section for selectively switching subject light that has passed through the photographing lens to either one of the first image sensor or the second image sensor;
a display section for displaying an image taken by the first and the second image sensor so that a display region for displaying an image taken by the first image sensor and a display region for displaying an image taken by the second image sensor match;
an image data storing section for storing an image data based on output of the first image sensor and the second image sensor; and
a display region storage section for storing information to selectively read out image data to display an image on the display section from image data stored based on output of the second image sensor, wherein
the display section controls the display region based on the information stored in the display region storage section.

2. The imaging device of claim 1, further comprising a screen for forming a subject image that has passed through the photographing lens, wherein the second image sensor takes the subject image that has been formed on the screen.

3. The imaging device of claim 2, further comprising an imaging lens for guiding a subject image displayed on the screen to a photographer's eye.

4. The imaging device of claim 2, wherein the screen has a rectangular display section, information of a specified rectangular display region, having intersect points of two diagonal lines of a rectangular display section of the screen as a center, is stored in the display region information storage section, and a position of an image formed on the screen and a position of an image formed using the first image sensor are subjected to predetermined adjustment.

* * * * *